F. W. HARRIS.
PROCESS AND APPARATUS FOR TREATING DRILL PIPE.
APPLICATION FILED JAN. 10, 1916.
1,253,966.
Patented Jan. 15, 1918.
3 SHEETS—SHEET 1.
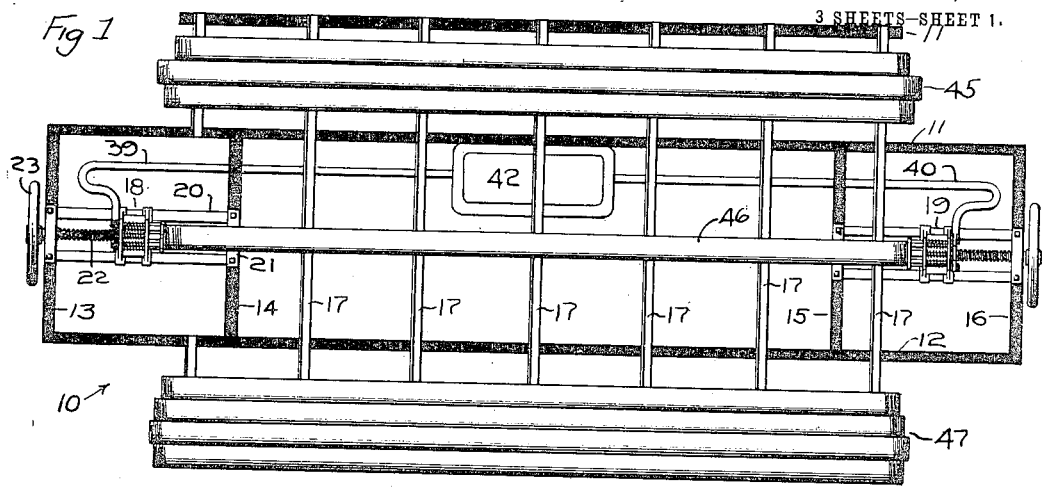
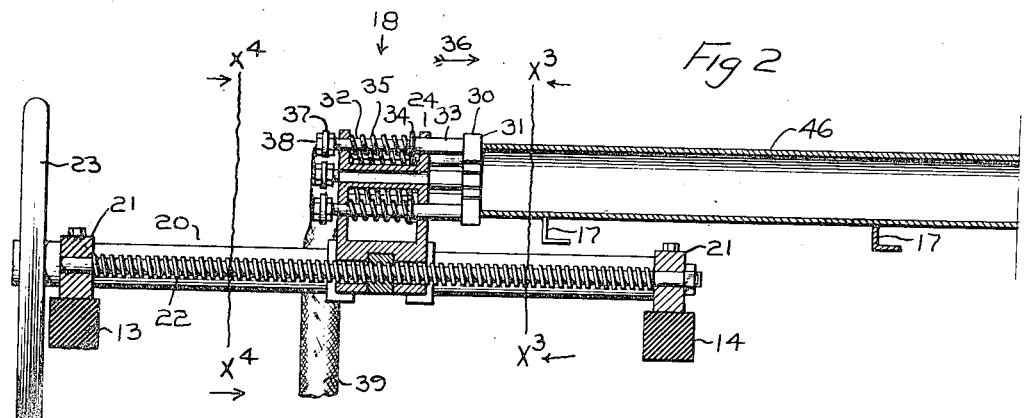
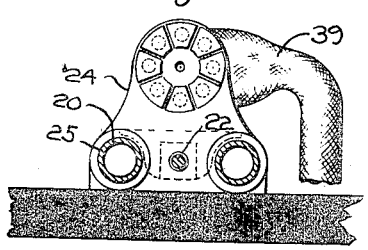
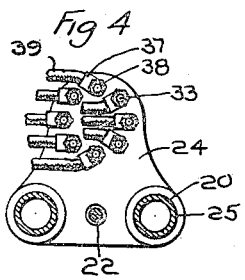
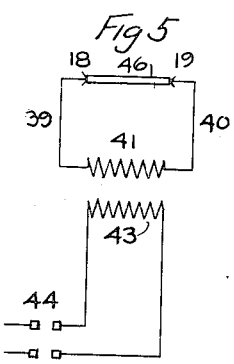
FORD W. HARRIS, INVENTOR
BY
Townsend Graham + Harris
HIS ATTORNEYS

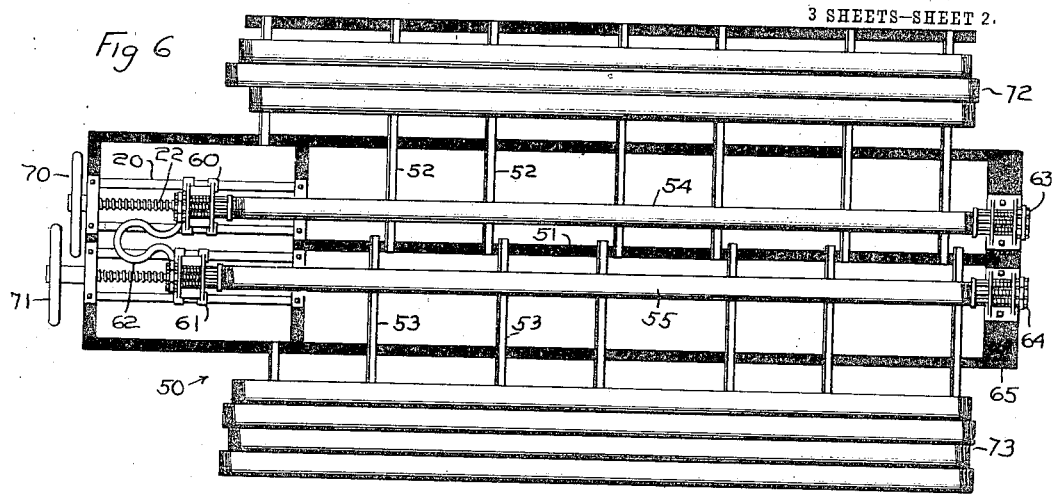
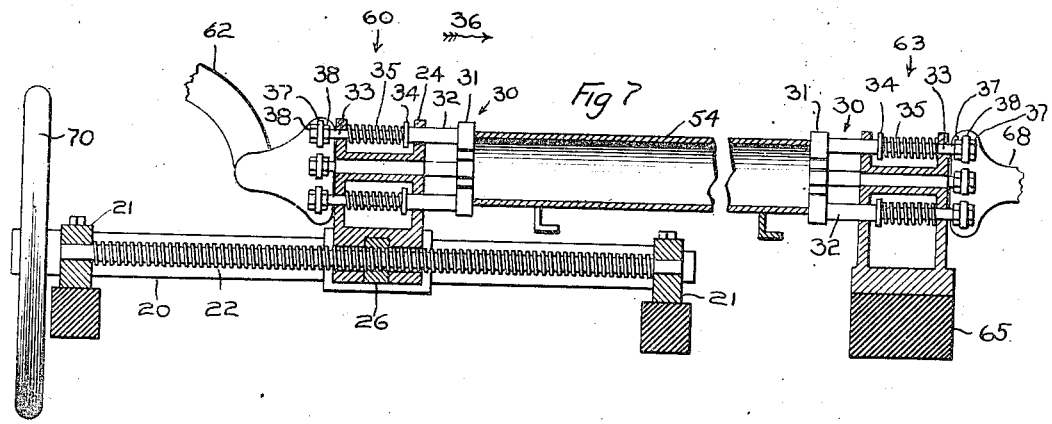
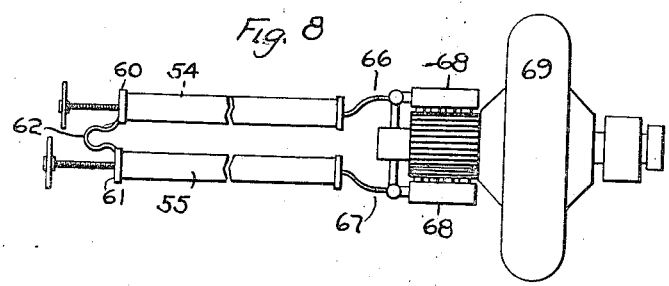

F. W. HARRIS.
PROCESS AND APPARATUS FOR TREATING DRILL PIPE.
APPLICATION FILED JAN. 10, 1916.
1,253,966.
Patented Jan. 15, 1918.
3 SHEETS—SHEET 3.
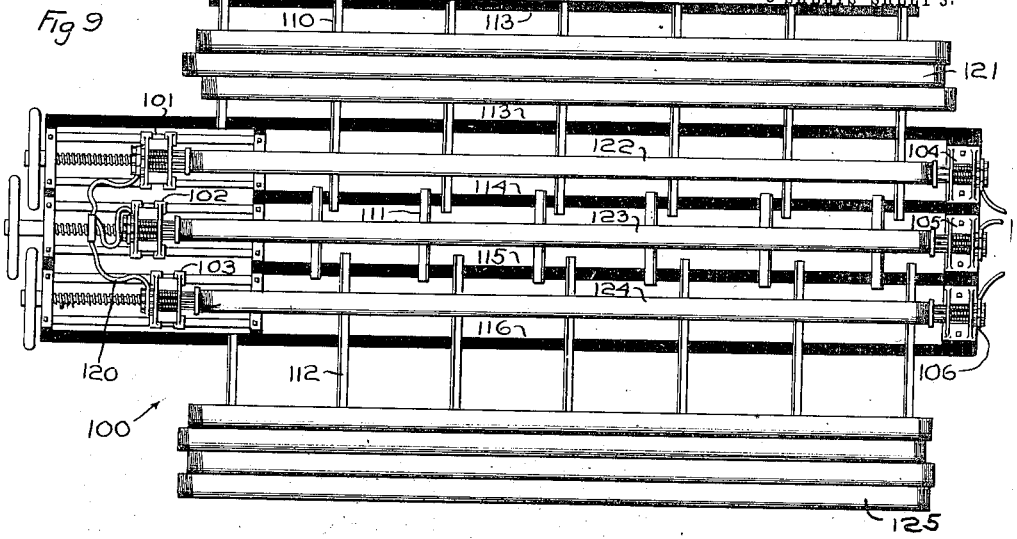
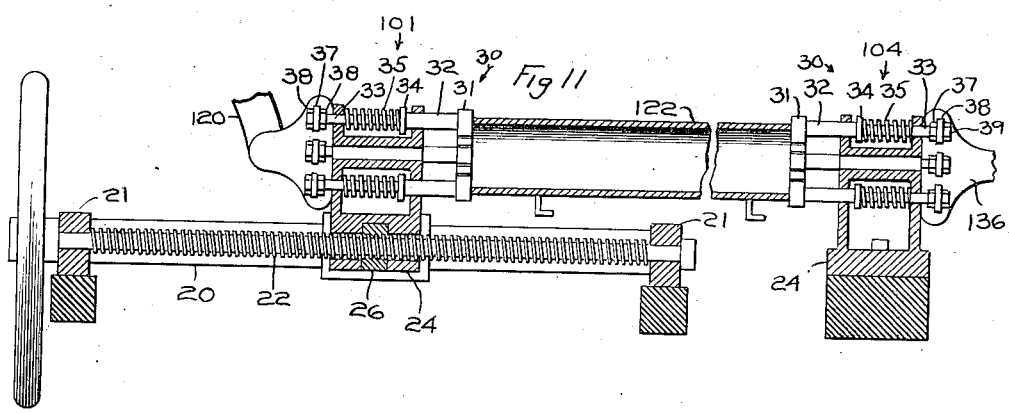
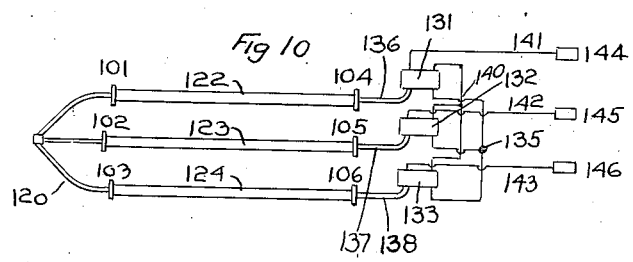
FORD W. HARRIS, INVENTOR
BY
Townsend Graham & Harris
HIS ATTORNEYS

UNITED STATES PATENT OFFICE.

FORD W. HARRIS, OF LOS ANGELES, CALIFORNIA, ASSIGNOR TO THE BARDEEN CORPORATION, OF LOS ANGELES, CALIFORNIA, A CORPORATION OF CALIFORNIA.

PROCESS AND APPARATUS FOR TREATING DRILL-PIPE.

1,253,966.  Specification of Letters Patent.  Patented Jan. 15, 1918.

Application filed January 10, 1916. Serial No. 71,387.

*To all whom it may concern:*

Be it known that I, FORD W. HARRIS, a citizen of the United States, residing at Los Angeles, in the county of Los Angeles and State of California, have invented a new and useful Process and Apparatus for Treating Drill-Pipe, of which the following is a specification.

My invention relates to the art of treating medium steel to improve its mechanical characteristics.

The object of the treatment is to so modify the steel that it will successfully resist repeated shocks or stresses. The treatment may be applied to imperfect commercial steels as they come from the steel mill, or may be preferably used to restore originally perfect steel, which has been weakened by use, to its original condition.

The invention is especially applicable to the treatment of pipe and finds a wide commercial field in the treatment of drill pipe which is used in drilling oil wells by the so-called rotary system. As an illustration of the utility of my invention the following specification will be devoted to this particular application of my process, although it will be evident that other similar uses fall within the scope of the invention.

In the drilling of oil wells by the so-called rotary system it is common to use drill pipe approximately $\frac{5}{16}$ inch in thickness, and either 4 inches, or 6 inches in internal diameter. This pipe is ordinarily supplied in sections from twenty to thirty feet long and these sections are joined by suitable collars into "stands" of three or four joints each, these stands being mutually joined by tool joints to form a "string". A string of this pipe suitably guided vertically is rotated by a suitable table, the string carrying the cutting bit at its lower end. At the time of completion of a deep oil well it is not unusual for the driller to have in use from three to four thousand feet of drill pipe. This service is very severe and the drill pipe is subjected to heavy mechanical strains during the drilling gradually becoming very brittle due to "fatigue" or "crystallization".

The exact reasons for, and theory of, the deterioration of steel under repeated shocks or stresses is the subject of considerable discussion and the theory thereof need not be gone into here as the fact that steel does deteriorate when subjected to repeated shocks and stresses is well known, the steel when so deteriorated being commonly spoken of as "crystallized".

The deterioration of drill pipes is a serious matter as it is the cause of many delays and great expense, due to the twisting off of the pipe in the well and the difficulty of "fishing" or recovering the broken pipe. Wells have often been lost due to this cause when partially or nearly completed. By my invention I am able to treat the deteriorated pipe so that ability to stand the service it is used for is greatly increased.

My invention consists in heating the pipe to a certain critical temperature simultaneously maintaining a considerable pressure on the ends of the pipe. I believe that "fatigue" or "crystallization" is no more than a gradual breaking of the bond between the iron crystals that make up the body of the pipe, and that so called "crystallized" pipe is pipe which is full of minute tears or fissures. I further believe that by heating the pipe to, or near, a welding temperature, and at the same time subjecting it to mechanical pressure in the direction of its axis, that I close up and weld these tears or fissures, restoring the pipe to its original condition.

It is a well known fact that in any form of steel there is a certain crystalline structure and that the coarseness of the crystals and the physical properties of the steel can in a large measure be regulated by heating to certain definite temperatures. In any sort of gas or oil fired furnace it is a very difficult matter to so regulate the heat that this definite temperature is exactly and uniformly reached and not exceeded, especially where the furnace walls themselves absorb and store heat. For this reason I prefer to use electric current as a heating medium and to treat the pipe in the open air, as it is possible by passing an electric current through a pipe lying on an open rack to bring the pipe up to its critical temperature and to instantly stop the heating by cutting off the flow of current.

I have found further that there is a wide variation in the physical characteristics of pipe as ordinarily furnished by the mill, and that such pipe can ordinarily be much improved by being treated by my process. This is partly due to the greater accuracy with which I can control the temperature of the pipe, and partly due to other causes. Among these other causes may be mentioned the uniform distribution of heat in the body of the pipe. In the commercial production of drill pipe it is customary to upset and thicken the end of pipe to receive the thread, this upsetting being done after the pipe has been welded, by heating, the ends of the pipe only. It is found in practice that this partial heating destroys the uniformity of the pipe, and breaks usually occur at or near the upset. By uniformly heating the entire pipe to the exact ideal temperature any soft or hard spots are effectually eradicated.

Further objects and advantages will be made evident hereinafter.

In the annexed drawings three forms of my invention are shown.

In the first form Figure 1 is a plan view of the form of apparatus which may be used where a single phase alternating current is employed.

Fig. 2 is a side elevation on an enlarged scale of one of the sliding heads shown in Fig. 1, a portion thereof being shown in section to better illustrate my invention.

Fig. 3 is a section on a plane represented by the line $x^3$—$x^3$ of Fig. 2, the pipe being omitted and the section being viewed in the direction of the arrows.

Fig. 4 is a section on a plane represented by the line $x^4$—$x^4$ of Fig. 2, the section being viewed in the direction of the arrows.

Fig. 5 is a diagram of connections of the apparatus shown in Figs. 1 to 4 inclusive.

Fig. 6 is a plan view of an alternate form of apparatus which may be used where direct current or single phase alternating current is employed.

Fig. 7 is a side elevation on an enlarged scale of the heads shown in Fig. 6, a portion thereof being shown in section to better illustrate the invention.

Fig. 8 is a diagram of the apparatus illustrated in Figs. 6 and 7, showing the method of connecting to a direct current generator.

Fig. 9 is a plan view of another alternate form of apparatus which may be employed when three phase alternating current is used.

Fig. 10 is a diagrammatic plan view of the apparatus shown in Fig. 9 showing the method of connecting the transformers.

Fig. 11 is a side elevation on an enlarged scale of the pipe and heads used in the form shown in Fig. 9, a portion thereof being shown in section to better illustrate my invention.

In the form of the invention illustrated in Figs. 1 to 5, I provide a rack 10, this rack consisting of a rectangular insulating frame preferably formed of wood side members 11 and 12 connected by wood cross members 13, 14, 15 and 16. Wood is used for the members 11 to 16 as it is cheap and a fair insulator when dry. Mounted on the members 11 and 12 are a series of angle iron members 17, these members extending completely across and projecting outwardly over the members 11 and 12, and forming a rest and track over which the pipe may be rolled. Mounted between the members 13 and 14 is a movable head 18, and mounted between the members 15 and 16 is a movable head 19. These movable heads 18 and 19 are duplicates of each other, each consisting of two pipe guides 20 secured by means of suitable bearings 21 to the cross members 13 and 14, or 15 and 16. Journaled in each of the bearings 21 is a screw 22, each of which may be operated by a hand wheel 23. Sliding on each pair of pipes 20 is a body 24, this body having openings 25 formed therein to receive the pipe guides 20. A nut 26 is inserted in a square opening in the bottom of each of the bodies 24 in such a manner that it cannot turn, each of the screws 22 being threaded in one of the nuts 26. A series of fingers 30 are secured in each of the bodies 24, each of these fingers consisting of a head 31, a cylindrical portion 32, and a smaller cylindrical portion 33. A washer 34 is placed on the smaller cylindrical portion 33 abutting against a shoulder formed between the portions 32 and 33. A compression spring 35 is placed over the portion 33, pressing against the washer 34, and forcing the fingers 30 in the direction of the arrow 36. Clamped by means of nuts 38 on the end of the cylindrical portion 33 of each of the fingers 30 is a connector 37. Flexible cables 39 and 40 are soldered into and connect the connectors 37 to the secondary 41 of a transformer 42, the cables 39 connecting the fingers 30 of the head 18 with one terminal of the secondary, and the cable 40 connecting the fingers 30 of the head 19 with the other terminal of the secondary. The primary 43 of the transformer 42 is connected through a suitable switch 44 with any convenient source of alternating power.

The method of operation may be best understood from a reference to Fig. 1, in which 45 represents pipe which is to be treated, 46 represents a joint of pipe which is being treated, and 47 represents pipe which has been treated. The members 17 are so placed that a piece of pipe lying thereon may be placed in axial relationship with each of the heads 18 and 19. This pipe may be of different lengths, and the heads 18 and 19 may be adjusted by means of the screws 22 and the hand wheels 23 to suit any of the commercial lengths. The heads having been properly adjusted to this length, one of the pipes 45 is rolled into the position 46, and the fingers 30 of one of the heads, 18 for example, is pressed firmly against the end of the pipe by means of one of the hand wheels 23. The pressure of the fingers 30 is transmitted through the pipe 46 to the fingers 30 of the head 19 with the result that each of the fingers 30 on each of the heads is forced over against its spring 35, so that an approximately uniform and equal pressure is exerted by each of the fingers on the end of the pipe 46. The switch 44 is then closed and a heavy alternating current flows through the cables 39 and 40, and through the pipe 46. This current should preferably be of from 5,000 to 15,000 amperes, depending on the size of pipe to be treated and the length of time in which it is desired to raise it to the required temperature. In addition to the current from the transformer 42 which flows through the pipe I believe that there are heavy currents set up by induction in the body of the pipe. During the heating of the pipe it expands, and the hand wheels 23 may be utilized to adjust the heads 18 and 19 to maintain an even pressure. During this period, temperature readings should be taken by a suitable pyrometer or pyroscope, and when the desired temperature is reached the switch 44 is opened thus cutting the current off the primary of the transformer 42 and immediately discontinuing the heating operation. I prefer to heat the pipe to from 800° to 900° centigrade, and I find that I can maintain a pressure of approximately 3,000 pounds on the end of a 4" to 6" pipe without injuring the threads on the end thereof. By heating to this temperature and by maintaining such a pressure it is possible to put the pipe in an ideal physical condition to resist shocks and stresses.

In the form of invention illustrated in Figs. 6, 7 and 8, I show my invention as adapted to be utilized with direct current. Direct current has certain advantages over alternating current, and certain disadvantages which are evident to one skilled in the art. In general, it may be said that the principal advantage of direct current is elimination of the large induction due to heavy alternating currents when used in the presence of magnetic materials. The principal disadvantages of direct current are the expense and difficulties inherent to the operation of large current low voltage generators. I find also that the direct currents passing through the fingers 30 must be greater than an alternating current giving the same energy in the pipe on account of the supplementary currents induced in the pipe where alternating currents are used.

In the form of my invention illustrated in Figs. 6, 7 and 8, a rack 50 is employed, this rack being similar in construction to that illustrated in Fig. 1 with the addition of a central insulating member 51. Angle iron supports 52 and 53 are provided, these angle irons corresponding to the angle irons 17, and being arranged as shown so that the pipes 54 and 55, which are being treated, will be electrically insulated from each other. Two movable heads 60 and 61 are similar to the heads 18 and 19 already described are provided, the fingers 30 of the head 60 being electrically connected to the fingers 30 of the head 61 through a flexible cable 62. Stationary heads 63 and 64 similar to the heads 18 and 19 are rigidly mounted on an end member 65, being insulated from each other and connected, by means of cables 66 and 67, with the brushes 68 of the direct current generator 69 which may be driven by any suitable source of power not shown. Hand wheels 70 and 71 are used to adjust the heads 60 and 61 to suit different lengths of pipe. 72 represents pipe to be treated, 54 and 55 represents pipe being treated, and 73 representing pipe which has been treated. The method of operation is similar to that already described, the pipes 54 and 55 being rolled into place and being clamped between the fingers 30 of the heads 60 and 63, and 61 and 64 respectively.

With the apparatus connected as shown in Fig. 8, current flows from one of the brushes 68 through the cable 66, the pipe 54, the connection 62, the pipe 55 and the cable 67 to the other brush 68 of the generator 69. I have found also that this arrangement of two parallel pipes works out to very good advantage where a single phase alternatitng current is used, the pipes 54 and 55 being preferably placed close together so as to greatly reduce the inductive voltage drop and consequently to improve the power factor of the system. When so used, I substitute the low voltage secondary of a transformer for the generator 69.

In the practical use of my invention I have found that the power companies object to supplying single phase alternating current for use in my invention on account of the fact that the power factor of such a load is low, and the unbalancing of their systems very difficult to take care of.

For the purpose of doing away with this difficulty and expediting the work of treating pipe, I have devised the three phase outfit illustrated by Figs. 9, 10 and 11, in which a rack 100 is provided, this rack having three movable heads 101, 102 and 103, and three stationary heads 104, 105 and 106, these heads being constructed similarly to those already described. The members 17 of Fig. 1 are replaced in this form of construction by three members 110, 111 and 112, these members being insulated from each other and supported on insulating members 113, 114, 115 and 116, the members 110 to 116 inclusive forming part of the rack 100. The three heads 101, 102 and 103 are all connected together by means of a connection 120. 121 represents pipe to be treated, 122, 123 and 124 represent three joints of pipe being treated simultaneously, and 125 represents pipe which has been treated.

In practice I connect the apparatus as shown in Fig. 11, in which 131, 132 and 133 represent three transformers, one side of the secondary of each of these transformers being connected to a common point 135, the other side of the secondaries of the transformers being connected through wires 136, 137 and 138 with the fingers 30 of three stationary heads 104, 105 and 106. One side of each of the primaries is connected to a common point 140, the other side being connected through wires 141, 142 and 143 with suitable switching devices 144, 145 and 146, these devices being connected to the three wires of the three phase system. By utilizing the apparatus shown in Fig. 3, the power factor of the system is materially improved, due to the fact that the three parallel pipes largely reduce the self inductiton of the circuit, and the three phases of the system are practically equally loaded.

It will be noted that in all the methods shown, I utilize the principle of heating the pipe by an electric current and maintaining it under mechanical pressure at the same time. It will be noted further that in all the forms disclosed I use a plurality of fingers resting against the end of the pipe, each of these fingers having its individual spring so that the pressure thereof is regulated, and each of these fingers serving the double purpose of conducting current into the pipe and producing a mechanical stress therein. It is to be noted further that the pipe is threaded at either end and that by my method current is introduced into the pipe without injuring the threads thereof. In practice I find it necessary to frequently dress the fingers and to brighten the end of the pipe before attempting to anneal it, so that a good electrical contact is obtained between the fingers and the end of the pipe.

I claim as my invention:—

1. An apparatus for treating pipe comprising a rack composed of series of supports having their upper surfaces in the same plane, a pair of stationary heads secured to one end of said rack and insulated from one another and from the rack, a pair of movable heads electrically connected together but electrically insulated from said rack, means for moving said movable heads to clamp against one end of a pair of pipes, the other end of said pipes being engaged by said stationary heads, and a source of electrical energy having one of its terminals connected to one of said stationary heads the other terminal of said source of power being connected to the other stationary head.

2. An apparatus for treating pipe comprising a pair of electrically connected heads, means for electrically connecting said heads to one end of a pair of pipes, a pair of electrically insulated heads, means for connecting said heads to the other end of said pipes, and means for creating an electrical potential between said insulated heads.

3. An apparatus for treating pipe comprising three electrically connected heads, means for electrically connecting each of said heads to one end of one of three sections of pipe, three electrically insulated heads, means for connecting each of said electrically insulated heads to the other end of one of said sections of pipe, and means for connecting a three phase source of energy to said heads in such a manner that one of said pipes received energy from each of said phases.

4. In an apparatus for treating pipe, a head comprising a body, guides in which said body may move along the axis of the pipe, means for moving said body along said axis, a series of fingers adapted to press against the end of the pipe, and spring means between each of said fingers and said body.

5. In an apparatus for treating pipe, a supporting structure; guides secured in said structure; a body constrained to move in a definite path by said guides; a finger sliding in said body; elastic means for preventing said finger from sliding in said body; flexible means for electrically connecting said finger to an electrical circuit; and means for moving said body in said path.

6. In an apparatus for treating pipe; a supporting structure; guides secured in said structure; a body constrained to move in a definite path by said guides; a plurality of fingers each so placed as to slide in said body; a series of springs, each spring being so placed that it resists any tendency of one of said fingers to slide in said body; means for independently connecting each of said fingers to an electrical circuit; and means for moving said body in said path.

7. In an apparatus for treating pipe; supporting means for said pipe; a body; guides so formed and placed as to constrain said body to move in a path parallel to or coincident with the axis of said pipe; a finger so mounted in said body as to press against the end of said pipe, said finger having a limited movement in said body along a line parallel with the axis of said pipe; elastic means for holding said finger against the end of said pipe; flexible means for electrically connecting said finger to an electric circuit; and means for forcing said body along said path.

8. In an apparatus for treating pipe; supporting means for said pipe; a body; guides so formed and placed as to constrain said body to move in a path parallel to or coincident with the axis of said pipe; a plurality of fingers, each so mounted in said body as to press against the end of said pipe and to have a limited movement in said body along a line parallel to the axis of said pipe; a plurality of springs each spring being so associated with one of said fingers as to prevent said limited movement and hold said finger in contact with said pipe; flexible means for independently connecting each of said fingers with an electric circuit; and means for forcing said body along said path.

9. In an apparatus for treating pipe; a pair of insulated stationary heads; a pair of movable heads; means for electrically connecting said movable heads; and a direct current generator having its terminals connected to said stationary heads.

10. A method of annealing crystallized drill pipe which consists in heating the pipe to an annealing temperature and simultaneously subjecting the pipe to considerable axial pressure.

In testimony whereof, I have hereunto set my hand at Los Angeles, California, this 30th day of December, 1915.

FORD W. HARRIS.